Aug. 18, 1925.
W. E. GUEST
SOLDERING IRON
Filed April 26, 1924
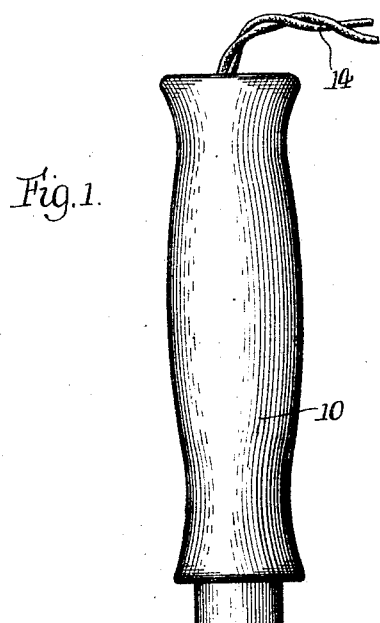
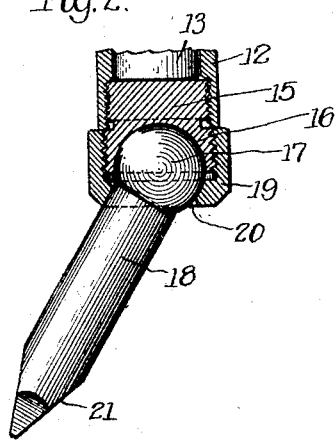
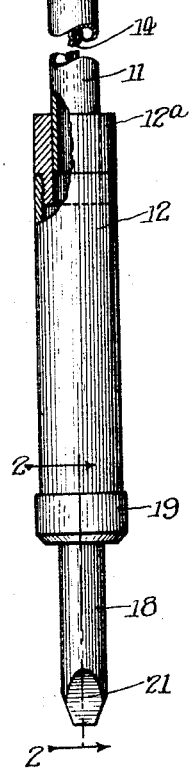
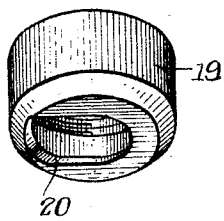
Inventor:
Ward E. Guest,
By Churchill Parker Carlson
Attys.

Patented Aug. 18, 1925.

1,549,914

UNITED STATES PATENT OFFICE.

WARD E. GUEST, OF CHICAGO, ILLINOIS, ASSIGNOR TO WARD MANUFACTURING COMPANY, OF CHICAGO, ILLINOIS, A CORPORATION OF ILLINOIS.

SOLDERING IRON.

Application filed April 26, 1924. Serial No. 709,110.

*To all whom it may concern:*

Be it known that I, WARD E. GUEST, a citizen of the United States, residing in the city of Chicago, county of Cook, and State of Illinois, have invented a certain new and useful Soldering Iron, of which the following is a specification.

My invention pertains to soldering irons, and has particular reference to improvements in electrically heated soldering irons.

The primary object of my invention is to provide a handy soldering iron having an improved adjustable point, which is adapted for use in a wide range of places, and particularly in awkward places not easily accessible.

A further object is to provide an electrically heated soldering iron having an adjustable point which may be easily removed for purposes of repair, renewal, or replacement, and which can still be brought up rapidly and efficiently to the desired working temperature.

Another object is to provide a soldering iron wherein the point is connected to the metallic body by a simple and efficient joint which permits of a wide range of adjustment and of easy and quick adjustment while the point is hot, which holds the point in adjusted position without the use of springs or other means subject to deterioration or injury when heated, and which is formed with a large continuous contacting surface and no appreciable air gap thereby obtaining efficient conduction of heat from the heating unit to the point.

Further objects and advantages will become apparent as the description proceeds.

In the drawings, Figure 1 is a plan view of a soldering iron embodying the features of my invention.

Fig. 2 is a fragmentary sectional view taken in the plane of line 2—2 of Fig. 1, and showing the adjustable joint.

Fig. 3 is a perspective view of the slotted gland for retaining the point in place.

While I have shown in the drawings and will herein describe the preferred embodiment of my invention for purposes of illustration, it is to be understood that various modifications and alternative constructions may be made without departing from the spirit and scope of the invention as expressed in the appended claims.

Referring to the drawings, 10 represents a handle of non-conducting material such as wood to which a tubular stem 11 is secured. A closed cylindrical shell 12 is threaded on or removably secured in any other suitable manner to a fitting 12$^a$ mounted on the forward end of the stem 11, and constitutes a casing having electrical heating unit or element 13. Feed wires 14 are led through the handle 10 and stem 11 for connection to the terminals of the heating unit 13.

The lower or forward end wall of the casing 12 is in the present instance made separately from the sleeve. Thus this end of the casing is closed by the reduced portion of a solid metallic head 15 having a semi-spherical depression or socket 16 formed in its outer face. A solid rounded head or ball 17 is formed on one end of a soldering point or tip 18, and fits snugly within the socket 16 in the lower or forward end of the casing. This ball is movably retained within the socket 16 by a gland 19 threaded over the front end of the head 15, the gland having a slot 20 fitting about the point 18. The slot 20 is elongated, as shown in Fig. 3, to allow angular adjustment of the soldering point 18 relative to the sleeve 12, and is concentric at one end with the sleeve 12 to hold the point 18 exactly straight with the former when desired. The forward end of the point 18 is tapered in the usual way as indicated at 21. The sleeve 12, head 15, and point 18 may be made of any suitable heat conducting material, such as brass or copper.

It will be apparent that by the above construction a simple and efficient adjustable soldering iron is obtained. The point 18 may be easily and quickly adjusted whether hot or cold, and can be readily removed for repair or replacement. No parts of the connection are susceptible of injury by heat. The screw-threaded element 19 serves to clamp the ball 17 in intimate heat conducting contact with its seat in the lower end wall of the casing, with a consequent elimination of all air gaps and hence an efficient conduction of heat from the electric heating unit 13 to the point 18 notwithstanding the adjustability and removability of the latter.

I claim as my invention:

1. An electrical soldering iron having a tubular casing, an electric heating element enclosed in said casing, a soldering point having a ball at its upper end seated in the lower end of the casing, and a screw-threaded element adapted to clamp said ball against movement in its said seat and also in intimate heat-conducting contact with the casing.

2. An electrical soldering iron having a tubular casing, an electric heating element enclosed in said casing, a soldering point having a rounded head at its upper end, said casing having a rounded seat for said head, and a screw-threaded element for clamping said rounded head in various positions in its seat but at all times in intimate heat-conducting contact with the casing.

3. An electrical soldering iron having a tubular casing, an electric heating element enclosed in said casing, a soldering point having a rounded head at its upper end seated in the lower end of the casing, and means for clamping said head against movement in its seat and in intimate heat-conducting contact with the casing comprising a gland having a skirt with a screw-threaded connection with the lower end of the casing, said gland further having an end wall with an elongated opening therein adapted to permit of a limited pivotal adjustment of the soldering point.

In testimony whereof, I have hereunto affixed my signature.

WARD E. GUEST.